United States Patent [19]

Prudhon et al.

[11] Patent Number: 4,970,030
[45] Date of Patent: Nov. 13, 1990

[54] PROCESS FOR CONTACTING SUBSTANCES WHICH OCCUR IN DIFFERENT PHASES

[75] Inventors: Francois Prudhon; Augustin Scicluna, both of Saint-Auban, France

[73] Assignee: Rhone-Poulenc Industries, Courbevoie, France

[21] Appl. No.: 385,983

[22] Filed: Jul. 24, 1989

Related U.S. Application Data

[63] Continuation of Ser. No. 258,101, Oct. 13, 1988, abandoned, which is a continuation of Ser. No. 23,882, Mar. 11, 1987, abandoned, which is a continuation of Ser. No. 445,686, Dec. 1, 1982, abandoned, which is a continuation of Ser. No. 916,477, Jun. 19, 1978, abandoned, which is a continuation of Ser. No. 770,802, Feb. 22, 1977, abandoned, which is a continuation of Ser. No. 479,774, Jun. 17, 1974, abandoned.

[30] Foreign Application Priority Data

Jun. 19, 1973 [FR] France .................................. 73 22184

[51] Int. Cl.$^5$ .................................................... B01F 3/04
[52] U.S. Cl. ..................................... 261/79.2; 261/116
[58] Field of Search .......... 261/76, 77, 79.2, 115–118, 261/DIG. 54, DIG. 75; 159/4.01–4.09, 4.1; 239/403, 405, 406; 106/109; 431/173; 55/235–238, 257.1

[56] References Cited

U.S. PATENT DOCUMENTS

| | | | |
|---|---|---|---|
| 1,183,098 | 5/1916 | Merrell et al. ................. | 261/79.2 X |
| 2,847,083 | 8/1958 | Hibshman ....................... | 159/4.01 X |
| 2,887,390 | 5/1959 | Coulter et al. ................. | 159/4.03 X |
| 3,039,107 | 6/1962 | Bradford ........................ | 159/4.08 X |
| 3,050,374 | 8/1962 | Burt et al. ...................... | 159/4.1 X |
| 3,105,778 | 10/1963 | Anderson ....................... | 261/79.2 X |
| 3,110,444 | 11/1963 | Eakins ........................... | 159/4.01 X |
| 3,177,634 | 4/1965 | Latham, Jr. et al. ............. | 55/236 |
| 3,238,021 | 3/1966 | Webber et al. ................. | 261/79.2 X |
| 3,409,274 | 11/1968 | Lawton .......................... | 261/76 X |
| 4,124,353 | 11/1978 | Prudhon et al. ................ | 431/8 |
| 4,257,339 | 3/1981 | Prudhon et al. ................ | 110/346 |
| 4,263,234 | 4/1981 | Prudhon et al. ................ | 261/153 |
| 4,265,702 | 5/1981 | Prudhon et al. ................ | 261/115 X |
| 4,267,131 | 5/1981 | Prudhon et al. ................ | 261/153 |
| 4,350,101 | 9/1982 | Prudhon et al. ................ | 110/238 |
| 4,447,331 | 5/1984 | Prudhon et al. ................ | 210/721 |
| 4,526,529 | 7/1985 | Bernard et al. ................. | 431/9 |
| 4,562,778 | 1/1986 | Bernard et al. ................. | 110/260 |
| 4,668,441 | 5/1987 | Hess et al. ...................... | 261/79.2 |
| 4,671,947 | 6/1987 | Bourgeois et al. ............. | 423/308 |
| 4,671,948 | 6/1987 | Couffin et al. ................. | 423/315 |
| 4,671,949 | 6/1987 | Bourgeois et al. ............. | 423/315 |
| 4,748,016 | 5/1988 | Browaeys et al. ............. | 423/598 |

FOREIGN PATENT DOCUMENTS

| 869143 | 5/1961 | United Kingdom ............... | 159/4.01 |
| 1183355 | 3/1970 | United Kingdom ............... | 261/79.2 |

Primary Examiner—Richard L. Chiesa
Attorney, Agent, or Firm—Burns, Doane, Swecker & Mathis

[57] ABSTRACT

Process for effecting rapid and homogenous intimate contact of substances which occur in different phases. The process includes a step of producing contact between a helicoidal flow of substances, at least partially in the gaseous state, and a rectilinear flow which is coaxial with the first flow, of liquid or solid substances, at the outlet of a flow passage having a downstream constricted aperture, the amount of movement of the helicoidal flow at the outlet being at least 100 times greater than that of the rectilinear flow. This process can be used in particular for producing mixtures or for drying substances.

15 Claims, 3 Drawing Sheets

PROCESS FOR CONTACTING SUBSTANCES WHICH OCCUR IN DIFFERENT PHASES

This application is a continuation of application Ser. No. 07/258,101 filed on Oct. 13, 1988 (now abandoned), which was a continuation of application Ser. No. 07/023,882 filed on Mar. 11, 1987 (now abandoned), which was a continuation of application Ser. No. 06/445,686 filed on Dec. 1, 1982 (now abandoned), which was a continuation of application Ser. No. 05/916,477 filed on June 19, 1978 (now abandoned), which was a continuation of application Ser. No. 05/770,802 filed on Feb. 22, 1977 (now abandoned), which was a continuation of application Ser. No. 05/479,774 filed June 17, 1974 (now abandoned).

The present invention concerns a process for rapidly bringing into intimate contact substances in different physical states, and, consequently, facilitating the regular progression of the physical or chemical processes resulting from said contact.

Many processes are known for mixing various fluids within a gaseous medium and for providing for the phenomena which follow such mixing, such as drying or a chemical reaction, such as combustion. In conventional processes, a substantial pressure is used, which is applied to at least a part of the substances, while relatively large chambers are also used, such chambers being necessary to provide for the contact of the different phases with each other. This latter necessity is due to the fact that, since the systems for introducing the various fluids are independent from each other, the paths of movement of the different substances do not coincide with each other. This gives rise to the necessity of providing a large space in order to increase the probability of contact between, for example, a droplet of liquid and the volume of gas which is intended to convert such liquid droplet. This also means that a particle, which has already been converted in consequence of a first contact, can suffer deterioration after subsequent and repeated contacts, thus making it necessary for the man skilled in the art to adopt a compromise as between repeated contacts and insufficient contact of the substances with each other. Amongst other disadvantages, this causes deposits to be formed on the walls. In any case, especially in the particular case of treating unstable substances, the conventional systems cannot provide for the production of highly homogeneous products. The devices used for carrying out such processes are often referred to by the term "nozzle", followed by a trademark or by the English expression "Spray dryer"; this latter category includes systems of which a part is rotated.

The process according to the invention is distinguished from the conventional processes, in particular, in respect to the low pressure which is applied to the fluids at their intake, the simplicity of the material structures necessary for carrying out the process and, as regards the results obtained, by the homogeneity of the mixture which can be made in a small volume over a period of time which is sufficiently short to avoid deterioration of the unstable products.

The object of the invention is a process for contacting substances which occur in different phases, comprising, on the one hand, introducing the fluids in the gaseous state, with possibly entrained solids, in a flow which is formed by helicoidal paths of movement symmetrical with respect to at least a plane passing through the axis of said flow, and on the other hand, introducing the fluids in the liquid state, possibly mixed with solids, in a continuous rectilinear flow which is displaced at a speed of from 0.03 to 3 m/sec, being guided by a material conduit whose axis is that of the helicoidal flow, over a length which is equal to at least three times its internal diameter, reducing, downstream of the zones in which said substances are introduced, the flow passage diameter of the helicoidal flow in a proportion of from 1.5 to 5 times and preferably from 1.7 to 3.7 times, said restricted flow passage being of circular cross-section and symmetrical relative to the axis of the helicoidal and rectilinear flows, which cross-section must not be reduced by more than on quarter by the inlet conduit for the rectilinear flow, the downstream end of said conduit being in a plane which is spaced from the mean plane of the restricted flow passage of the helicoidal flow by a length which is between 0 and the mean radius of said flow passage, the substances forming the helicoidal flow having, at the level of said minimum free section, an amount of movement equal to at least 100 times (and preferably from 1000 to 10,000 times) the amount of movement of the substances forming the rectilinear flow, and then allowing the two flows to become distributed in a space having a diameter which is less than 4 meters but which is greater than that of the cross-section available for the helicoidal flow in front of the restricted flow passage.

The device in which the process of the invention is carried out comprises a tubular casing which is terminated at one end either by a truncated cone whose small base forms the downstream aperture of said device (or the restricted flow passage for the helicoidal flow), or by a planar surface which is apertured at its center by a circular aperture which is coaxial with the casing tube (which aperture also forms said restricted flow passage) and, at the other end, by a wall providing a passage for at least one internal pipe which is coaxial to the casing tube and which terminates at a distance from the mean plane of the circular aperture that is between 0 and the radius of said aperture, the external cross-section of the internal pipe being at most one quarter of the cross-section of said aperture. The device also comprises a means for introducing into the casing tube around the axial pipe, the other part of the substances, to be brought into contact, while imparting thereto a helicoidal movement which is symmetrical with respect to the conjoint axis of the casing tube and the internal pipe.

To prevent material being deposited around the downstream aperture of the casing tube, it is preferable for the aperture to comprise, towards the interior of the casing tube, a cylindrical coaxial surface which is from 0.8 to 3 mm in height, the junction with the external surface of a thicker wall being provided by a divergent bevel.

Inside, the downstream portion of the casing tube has an apex angle of from 50° to 180° C., the upper limit value corresponding to the planar surface and the other values to the truncated cone. In the latter case, the apex angle is preferably from 55° to 65°, and the internal pipe terminates in the frusto-conical part.

The internal pipe can itself surround other coaxial pipes, for example, when it is necessary to introduce a plurality of gas flows which are not to be brought into contact with each other before contact occurs with the helicoidal flow.

Hereinafter only the internal axial pipe, which is the outermost pipe, will be considered, the pipes disposed within the outermost pipe being of small thickness.

The helicoidal movement imparted to a part of the substances is effectively produced by introducing such substances by way of at least one tangential pipe which is fixed in the casing tube, at the level of the region through which the internal pipe passes along the axis thereof. Other means can be used, for example a helicoidal strip or deflector blades disposed around the internal pipe. In the latter instance, the flow which is to be set in helicoidal movement can be introduced by way of the end of the casing tube, around the internal pipe.

A particularly simple alternative embodiment, providing for a symmetrical flow, is that which comprises only a single tangential pipe. The cylindrical wall of the casing tube is then replaced by a perforated cylinder which is itself provided on the outside with a jacket into which the tangential pipe opens. The perforations, for a tube which is a few centimeters in diameter, are approximately a centimeter in diameter, and the proportion of the surface area of the holes, relative to the total surface area of the cylinder, is of the order of 20%. For larger dimensions, the diameter of the perforations can be up to 25 mm. In spite of the thickness of the material used, the hole must always remain a "thin-walled orifice". It is important for the distribution of the holes to be regular and for the apertured surface area to be such that, in most cases, the perforated cylinder does not produce a pressure drop of more than 50 g/sq.cm in the flow of fluids. A flow rate of 35 cubic meters/hour per hole of 20 mm diameter for example is highly possible. Such a cylinder can generally be used only when the flow introduced by way of the tangential pipe does not contain any solids in non-powder form.

The tangential pipes are preferably secured in the vicinity of the end of the casing tube. However, for practical reasons and in particular in order to permit the pipes easily to be welded to the casing tube, a small space can be provided between the tangential tubes and the end of the device. This does not interfere with operation of the device used for carrying out the process of the invention. When the device has a single tangential pipe and a perforated casing, the location of the tangential pipe is of less importance as regards producing a symmetrical and regular helicoidal flow. In order to ensure regularity of the flow passing through these pipes, it is necessary to maintain axial symmetry (with respect to the axis of the casing tube) when there are two or more tangential pipes.

The distance between the outlet aperture of the internal pipe and the mean plane of the downstream aperture of the casing tube is preferably between 0 and the radius of said aperture. Within the above-mentioned limits, by varying the distance between the mouth of the casing tube and that of the axial pipe, it is possible to modify the conditions of mixing and in particular the shape of the jet produced by the device of the invention. Therefore, the axial pipe can be so arranged that it can be displaced longitudinally. This provides an additional possibility as regards regulating the degree of fineness of spraying and the regularity thereof, depending on various parameters, including the relationship between the gas flow rate and the flow rate of the other phases.

In the event that the casing tube is partially closed by a planar surface, it is then preferable for the internal pipe to open outwardly of the chamber delimited by the casing tube and the planar surface. In some particular cases, such a device prevents deposits being formed at the periphery of the downstream aperture of the casing tube.

The cylindrical surface, provided at the mouth of the casing tube, is preferably from 1.5 to 3 mm in height in devices whose internal diameter is 10 mm and more, and from 0.8 to 1.5 mm as regards devices of a smaller diameter.

The ratio between the internal diameter of the casing tube and the mean diameter of the mouth of the casing tube is preferably from 1.5 to 5 and preferably from 1.7 to 3.7.

The ratio between the internal diameter of the axial pipe and the same mean diameter of the mouth of the tube is preferably from 0.1 to 0.45 and preferably from 0.15 to 0.4. When different flows are introduced by way of concentric pipes, if the thickness of the pipes is negligible, the ratio between the diameters of the outermost pipe and that of the mouth of the casing tube will be maintained within the above-mentioned limits. If, on the other hand, pipes which are disposed within other axial pipes are of substantial thickness, it will be seen that the ratio to be observed is that as between the free perpendicular cross-sections of the pipes and the mouth of the casing tube. It is moreover important that the casing tube and the internal pipes should be very precisely coaxial.

The total cross-sectional area of the inlet pipe or pipes for the substances which are subjected to the swirling movement is preferably from 1 to 3.5 times the free cross-section of the mouth of the casing tube.

The internal length of the cylindrical part of the casing tube is preferably from 1 to 10 times the diameter of the mouth.

The above-described device is fixed, for example, on a cylindrical-frustoconical container, in the cylindrical part thereof. The external circumference of the mouth of the device, described above, is then so arranged that it is flush, preferably precisely, with the internal surface of the container for drying or flash vaporization operations, for example.

This container must be of dimensions which are sufficient but which are less than 4 m, that is to say, generally from 1 to 4 m, in order to ensure totality of the transfer intended during the initial phase, before the fluids meet the walls, while profiting from the favorable conditions for the contact between the substances. The powder or grains produced are advantageously collected by means of a device of the cyclone type connected to the base of the truncated cone, in the case where the container having the above-mentioned shape is used. The container can also be of a double-cone configuration, whose apex angles are from 45° to 120°. The above-mentioned dimensions, which are to be used, are the diameter of the large base which is common to the two cones, and the total height of the two cones. In this case, the device according to the invention is fixed to the apex of the upper cone.

BRIEF DESCRIPTION OF THE DRAWINGS

The device for carrying out the invention is shown in the accompanying drawings which are to be considered as only illustrating the invention and not as restricting the invention as defined hereinafter in the appended claims.

DETAILED DESCRIPTION OF THE PREFERRED EMBODIMENTS

Figure 1:
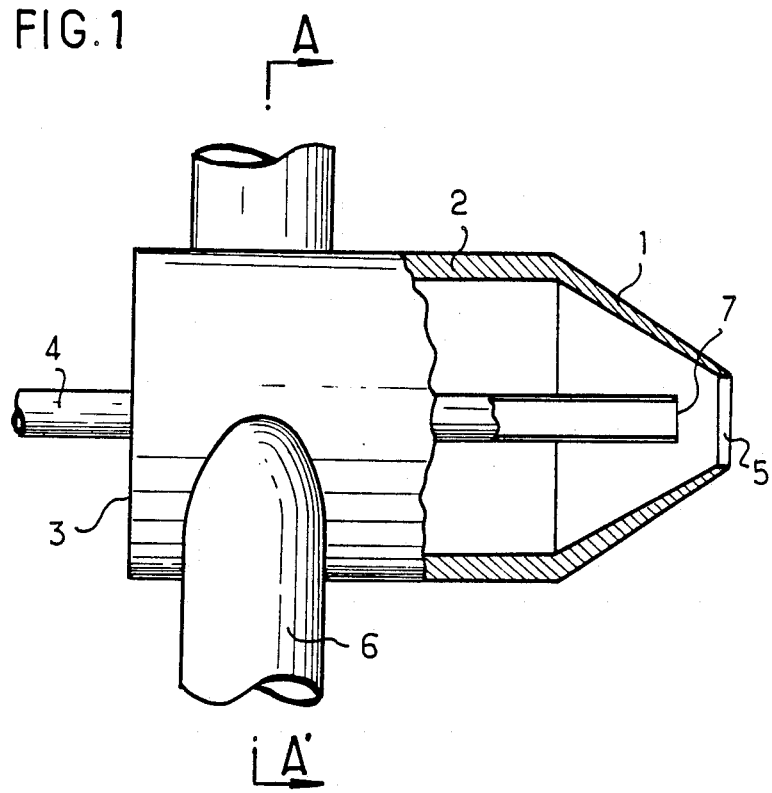
FIG. 1 is an elevational view partially in section of the device according to the invention.

FIG. 1 shows the casing of the device comprising a frustoconical portion 1, a cylindrical section 2 and a planar (or end) wall 3 at the center of which is disposed a pipe 4 for introducing a part of the substances which are to be brought into contact. The pipe passes into the cylindrical casing in the axis thereof and extends into the frustoconical portion, up to a certain distance from the small base (referred to as the mouth 5 of the device) of the frustoconical portion. At least one of the phases, which is generally gaseous and which is possibly charged with liquid or solids in suspension, is introduced by way of tangential pipes 6 which are so arranged that the flow thus introduced has a swirling movement before mixing with the other flow, shortly beyond the outlet aperture 7 of the axial pipe. The cross-sections of the tangential pipes 6 can be circular or elongate (elliptical, rectangular, etc.), the large axis in the latter cases being parallel to the axis of the device.

Figure 2:
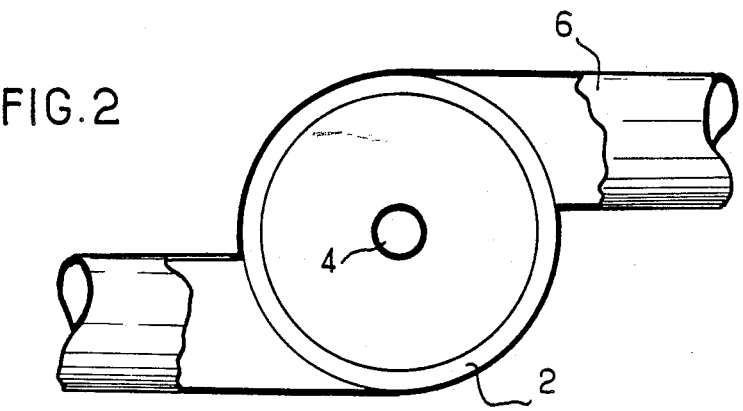
FIG. 2 is a sectional view taken along line A—A' in FIG. 1.

The same references denote the same components in the cross-sectional view taken along line A—A' of the device for carrying out the invention, as shown in FIG. 2.

Figure 3:
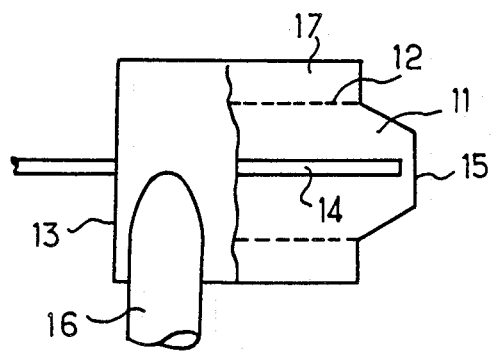
FIG. 3 is a side elevational view partly broken away of an alternative embodiment of the device of the invention, which comprises only one tangential pipe and which is provided with a perforated distributor cylinder.

The embodiment shown in FIG. 3 is an alternative form which makes it possible to use only a single tangential pipe, while producing a regular swirling movement. References 11, 12 and 13 respectively denote the frustoconical, and cylindrical portions, and the end of the casing tube, while references 14, 15 and 16 respectively denote the axial pipe, the mouth of the device and the tangential pipe. In this embodiment, the cylindrical part 12 is perforated and is surrounded by a casing 17 into which the tangential pipe 16 opens.

Figure 4:
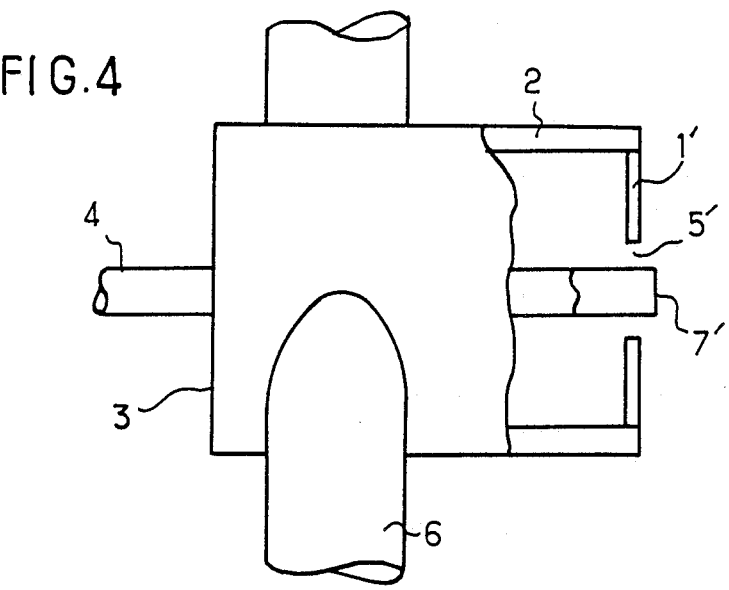
FIG. 4 is a side elevational view, partly broken away, of the device for carrying out the process of the invention, in which the casing tube is closed in a downstream direction by a planar surface which is apertured in its central part.

The device shown in FIG. 4 is, for the major part, similar to that shown in FIG. 1. Its cross-section, taken along the plane of the axes of the tangential pipes 6, is similar to that of FIG. 2. In FIG. 4 references 2, 3, 4 and 6 denote the same components as those appearing in FIG. 1. Reference 1' shows a flat plate (which replaces the truncated cone 1 in FIG. 1), reference 5' denotes the axial aperture and reference 7' denotes the downstream end of the internal pipe.

Figure 5:
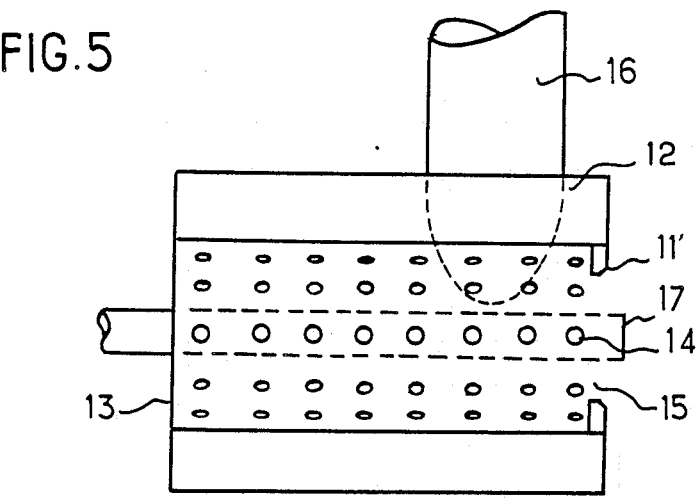
FIG. 5 is an axial cross-sectional view of an alternative embodiment of this device, in which the casing tube is partially closed on the downstream side by a planar wall which is apertured in its central part and in which the helicoidal flow is introduced by a single tangential pipe.

The device shown in FIG. 5 is likewise similar to that shown in FIG. 3, except for the downstream plate 11' which replaces the truncated cone 11. The other references remain the same in these two figures. In this embodiment, the mouth 15 has a cylindrical surface which is extended in a downstream direction, as far as the external surface of the plate, by a divergent bevel.

Figure 6:
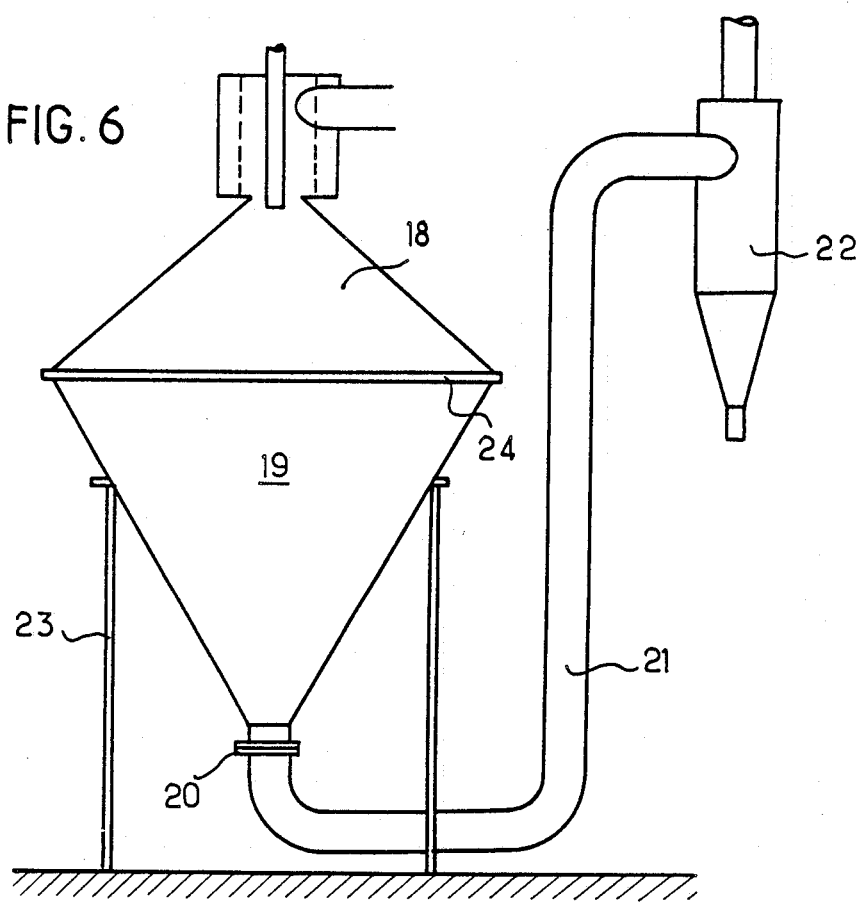
FIG. 6 is a side elevational view of the apparatus on which the device according to the invention is mounted.

FIG. 6 shows the whole of the apparatus on which the device of the invention, as heretofore described and denoted by reference numeral 2, is mounted. The mouth 5 of the device is fixed at the top of an upper divergent cone 18 of a container in the shape of a hopper whose lower conical portion 19 is connected by its apex 20 to a pipe 21 which opens tangentially into a cyclone separator 22 for collecting the resulting powdery or granular product. The container is supported by support members 23 which are shown only diagrammatically. Access can be had to the interior of the container, by separating the two conical portions at the level of their common large base 24.

As shown in FIG. 6, the device of the invention is mounted above the divergent cone 18 such that the conduit (4 in FIGS. 1 and 4; 14 in FIGS. 3 and 5) for the fluid introduced as a liquid stream in rectilinear flow is coaxial with a vertical axis passing through the center of the restricted aperture (5 in FIG. 1; 15 in FIGS. 3 and 5; 5' in FIG. 4). Accordingly, the gaseous or liquid phase ("first phase") introduced through the tangential pipe or pipes (6 in FIGS. 1, 2 and 4; 16 in FIGS. 3 and 5) will flow helicoidally in a vertically descending helical pattern which is symmetrical with respect to a first horizontal plane passing through the vertical axis of flow of the first phase. Furthermore, the symmetrical helical flow will pass through a restricted aperture of circular cross-section lying in a second horizontal plane and having its center along the vertical axis of the symmetrical helical flow. In addition, the flow of the first phase will pass through the restricted aperture into a circular space located below the restricted aperture such that the path of movement of the first phase following passage through the restricted aperture will be in the form of layered horizontal stacks of a plurality of hyperboloids and a localized low pressure zone of small width will be formed below the restricted aperture.

The fluid phase ("second phase") passing through the vertical pipe will be introduced as a liquid stream in rectilinear vertically descending flow through the restricted aperture along the vertical axis of the helicoidal flow of the first phase at a speed slow enough to permit the flow of the second phase to be a continuous stream. The second phase will pass outwardly and into direct contact with the first phase through an opening formed by the internal diameter of the vertical pipe, the opening being spaced from the second horizontal plane of the restricted aperture by a length which is between zero and a mean radius of the restricted aperture. Furthermore, the first phase will have an amount of movement at the restricted aperture at least 100 times that of the second phase passing outwardly of the opening in the conduit such that the second phase will be broken up substantially simultaneously upon engagement with the first phase into small particles which become entrained by the first phase for movement therewith with respect to the direction and intensity of the first phase. By virtue of the inventive arrangement, the paths of movement of the first phase will have identical speeds and the paths of movement of the second phase will have identical speeds when the first and second phases are brought into contact.

The advantages of the present process as hereinbelow described essentially arise by virtue of the coincidence as between the paths of movement of the various fluids and the identical speeds of such fluids as soon as they are brought into contact.

For the purposes of simplification, it will be assumed hereinafter that the helicoidal flow essentially comprises gas and the rectilinear flow essentially comprises liquids, as the presence of other phases does not substantially change the basic facts of this hypothesis. Therefore liquids and gas must follow the same paths of movement and must travel at identical speeds. In order to achieve this, the amount of movement which the gases enjoy must be great with respect to that of the liquids, in a ratio at least of 100 and preferably from 1000 to 10,000 times. Under such conditions, the movement of the gases is then imposed, as regards its direction and intensity, on the liquid droplets which are isolated from each other in the region of convergence of the two flow paths. The ratio between the above-mentioned amounts of movement is increased in the favor of the gases, by introducing the whole of the gases into the helicoidal flow (which differentiates this process from many previous processes which employ a secondary flow). The speed of the liquids is moreover reduced to close to the minimum which will permit the flow to be continuous. Under these conditions, the speed of the gases can remain relatively low in order not to require the use of substantial pressures (lower than 0.4 bars). The ratio between the masses of gas and liquid is obviously selected according to various factors, including the temperature of the fluids and the final operation to be carried out, such as, vaporization of the liquid. This ratio is at least 2.

The speeds and therefore the amounts of movement, at the level of the restricted flow passage, are easily calculated from the inlet flow rates of the fluids and the cross-section of the flow passage, pressures having little influence. The axial flow (liquid) is considered as being rectilinear and of a cross-section equal to that of the interior of its conduit, whether or not it projects from the restricted passage.

The paths of movement imposed by the gases form, at their outlet from the constraint zone, one of the two families of generating lines of a hyperboloid to a flat surface, or, more precisely, a layered stack of a plurality of hyperboloids. These generating lines pass through a family of circles forming a ring of small width, which is disposed downstream of the restricted passage for the helicoidal flow, before diverging. This ring surrounds a depression zone whose effect is noted on the one hand, upstream, on the liquid forming the rectilinear flow, and, on the other hand, downstream on the gases, by causing recycling of a portion of such fluids. The liquid is broken up into a multitude of droplets, each being taken in charge by a certain volume of gas and subjected to a movement which produces a centrifuge effect. This improves the contact with the vector gas and, in the case where combustion occurs, ensures ignition and stability of the flame.

The ratio between the flow rate of the gases and that of the liquids can vary within wide limits, an increase in this ratio reducing the size of the droplets formed.

It should be noted however that this process and the device for carrying out the process cannot be extrapolated indefinitely but are applied satisfactorily up to 2 t/h of liquid and, in some cases, up to 10 t/h.

The process for contacting substance in different physical conditions can thus be used, by means of the above-described device, for different operations which are currently carried out in particular in the chemical and foodstuffs industries.

In such operations, the flow which is subjected to the swirling movement is generally a gas or a vapor, which possibly carries in suspension solids or liquids which are to be brought into contact with the axially introduced substances. A pressure of a few hundreds of grams per square centimeter (generally less than 400 g/sq.cm) above the pressure prevailing in the part of the apparatus which is disposed downstream is sufficient to ensure good operation of the device. As previously described, the swirling movement produced by this flow causes a slight depression in its axial part, such that a flow of fluid can occur in the internal pipe without the necessity for applying a pressure to such fluid. Generally, apart from very viscous substances or thick mixtures, for the purposes of feeding the axial pipe, it is sufficient to put a container on load (a few decimeters above the device) or to use a conventional system for controlling and measuring flow rates.

When the rectilinear flow largely comprises solids, a device of the Archimedes screw type can be disposed in the rectilinear flow conduit.

Amongst the various categories of operations to which the above-described device lends itself, mention can primarily be made of the operation of rapid evaporation of volatizable compounds, particularly drying products in suspension or in aqueous emulsion, or the concentration of solutions, such as of mineral acids. Secondly, it was possible for mixing operations and for example the preparation of dry blend to be very satisfactorily carried out, like, in general, impregnating solids with liquids. A third category of operations which can be mentioned herein is the solidification of particles with conversion into fine balls, or the surface treatment of grains with possibly a change in the surface structure of such grains. In a fourth category of operations, it is also possible to produce reactions such as chlorination and oxidation reactions, within the homogeneous mixture produced. Included in this last type of reaction is in particular combustion, for example combustion of a fuel, from which the resulting hot gases can be used for drying other components of the mixture. As can be seen from this last case, several of the different categories of operations referred to above can be carried out simultaneously, the selection of the operating conditions and the values of adjustable dimensions making it possible, within certain limits, to determine the range of grain sizes of the products obtained, in a particular case, for example when drying compounds in emulsion and in particular producing very fine and regular powders.

The shape of the jet produced and the efficiency of contact, as between the different flows, are such that very hot gases can be introduced, and also damp substances, without there being any damage to the walls of the container disposed at the outlet of the device used in the invention, or crust deposit on said walls.

The shortness of the contact time necessary, for example for the evaporation of water present in a gas at a high temperature, is such that even substances which are particularly sensitive to heat can be dried without any deterioration of such substances being noted.

The absence of any discharge tube of small diameter and movable members makes it possible to treat solids of varying shapes and sizes without any filtering, provided obviously that the dimensions of the largest pieces are several times smaller than the smallest diameters in the apparatus.

Examples are given hereinafter for the sole purpose of illustrating use of the device of the invention, for different operations.

EXAMPLE 1

The apparatus used is similar to that shown in FIGS. 1, 2 and 6. The internal diameter of the casing tube is 52 mm, the length of the tube up to the large base of the truncated cone is 63 mm. The frustoconical portion is 30 mm in height, while the angle at its apex is 60°, and it terminates at an aperture which is defined by a cylindrical surface that is 2 mm in height and 20 mm in diameter. Two diametrically opposed tangential pipes, which are oriented in opposite directions relative to each other, are welded close to the end of the device. The axis of these pipes is set at 30 mm from the end of the device. The diameter of the pipes is 23 mm. An axial pipe, which is 4 mm in internal diameter and 6 mm in external diameter, has its downstream aperture in the truncated cone, at 8 mm from the outside circle of the mouth of the casing tube. 125 kg/h of dry polyvinyl chloride, carried by 500 cubic meters/hour of air at 50° C. and at a relative pressure of 200 g/sq.cm, is introduced into this apparatus by way of the tangential pipes, while 62.5 kg/h of dioctyl phthalate is introduced by way of the central pipe, 625 g of stabilizing agent known under the trademark "Stavinor" being added to the dioctyl phthalate. The temperature of the latter mixture is 100° C. The plasticized composition is formed in a hopper having an internal diameter of 1030 mm and a height of 500 mm, and is then collected in a cyclone device connected to the base of the hopper. This mixture has a remarkable degree of homogeneity. No trace of liquid, nor any solid deposit, is found on the walls of the hopper.

EXAMPLE 2

In this example, use is made of a nozzle of the type shown in FIG. 3, with the modification shown in FIG. 4. The internal diameter of the casing tube is 110 mm and its internal length is 128 mm. the casing has 18 circular holes which are 20 mm in diameter and which are distributed regularly in a quincunx arrangement on the casing. A tube, which has an internal diameter of 175 mm and which is coaxial to the first tube, delimits a jacket into which opens a tangential pipe which has an internal diameter of 46 mm and whose axis is positioned at 57 mm from the end of the casing tube. An internal pipe, which is also coaxial and which has external and internal diameters of 22 and 20 mm, passes through the end of the casing tube and projects 20 mm outside of the casing tube at the opposite end. This end is partially closed by a plate which is 5 mm in thickness and which has an aperture whose diameter is 60 mm, formed by a cylindrical surface which is 2 mm in height and which is connected to the external surface of the plate by a bevel.

500 kg/h of air at 500° C. is passed through the tangential pipe at a relative pressure of 250 mm of mercury. An aqueous slurry of copper oxychloride, containing 50% by weight of salt, flows at a rate of 100 kg/h into the internal pipe from a charging container. Mixing occurs in the same hopper as that described above. 50 kg/h of oxychloride is collected in the cyclone. The content by weight of water is 0.3% and the walls are not covered with any deposit clinging thereto.

Of the known processes, the only one which appeared to show a certain similarity with the process of the invention is carried out in a device which has an apparent similarity with that described above, in that it comprises a cylindrical casing tube, an internal pipe coaxial with the casing tube, a means for imparting a swirl movement to a part of the components of the mixture to be made, comprising a chamber whose section is in the form of a spiral, but on the casing tube there is no restriction at the downstream end.

Introducing the amount of air referred to above, under the same temperature and pressure conditions, causes projection of substances which adhere to the walls. Water is largely removed on the walls and not by transfer in the air.

From the abundance of the deposits on the walls, it is possible to foresee that a receiving hopper of substantially greater volume would not permit the desired result to be attained.

We claim:

1. A process for contacting substances which are in different phases, at least one of which is in a first phase which is a gaseous or vapor phase with or without entrained solids in solution or dispersion, comprising:
   (a) introducing said first phase in such a way that it flows helicoidally in a vertically descending helical pattern which is symmetrical with respect to a plane passing through an axis of helicoidal flow of said first phase;
   (b) passing said symmetrical helical flow through a restricted passage of circular cross-section having its center along the axis of helicoidal flow;
   (c) passing said flow of said first phase through said restricted passage into a circular space located below the restricted passage such that the paths of movement of said first phase following passage through the restricted passage are in the form of a layered stack of a plurality of hyperboloids and a localized zone of low pressure having a small width is formed below the restricted passage;
   (d) introducing a second phase which is a fluid as a liquid stream in vertically descending rectilinear flow through the restricted passage along the axis of helicoidal flow at a speed slow enough to permit the flow of the second phase to be a continuous stream, with said liquid stream being introduced directly into contact with said first phase through an opening formed by an inner wall at a downstream end of a conduit having a constant diameter at a portion thereof adjacent said opening which is coaxial with the axis of helicoidal flow, the opening being spaced from the plane of the restricted flow passage of the helicoidal flow by a length which is between zero and the mean radius of said restricted flow passage; and
   (e) imparting the first phase forming the helicoidal symmetrical flow an amount of movement at the level of the restricted passage of at least 100 times greater than the amount of movement of the second phase in rectilinear flow such that the second phase constituting the continuous rectilinear flow is broken up substantially simultaneously upon engagement with the first phase in helicoidal flow into small particles which become entrained by the first phase in helicoidal flow for movement therewith in the same direction and intensity.

2. A process for contacting substances which are in different phases, at least one of which is in a first phase which is a gaseous or vapor phase with or without entrained solids in solution or dispersion, comprising:
  (a) introducing said first phase in such a way that it flows helicoidally in a vertically descending helical pattern which is symmetrical with respect to a plane passing through an axis of helicoidal flow of said first phase;
  (b) passing said symmetrical helical flow through a restricted passage of circular cross-section having its center along the axis of helicoidal flow;
  (c) passing said flow of said first phase through said restricted passage into a circular space located below the restricted passage such that the paths of movement of said first phase following passage through the restricted passage are in the form of a layered stack of a plurality of hyperboloids and a localized zone of low pressure having a small width is formed below the restricted passage;
  (d) introducing a second phase which is a fluid as a liquid stream in vertically descending rectilinear flow through the restricted passage along the axis of helicoidal flow at a speed slow enough to permit the flow of the second phase to be a continuous stream, with said liquid stream being introduced through an opening, formed by an inner wall of a conduit having a constant diameter at a portion thereof adjacent said opening coaxial with the axis of helicoidal flow, the opening being spaced from the plane of the restricted flow passage of the helicoidal flow by a length which is between zero and the mean radius of said restricted flow passage; and
  (e) imparting the first phase forming the helicoidal symmetrical flow an amount of movement at the level of the restricted passage of at least 100 times greater than the amount of movement of the second phase in rectilinear flow such that the second phase constituting the continuous rectilinear flow is broken up substantially simultaneously upon engagement with the first phase in helicoidal flow into small particles which become entrained by the first phase in helicoidal flow for movement therewith in the same direction and intensity, said second phase being treatable at very high temperatures without any deterioration in the quality of said substances.

3. The process for contacting substances of claim 2, wherein said high temperatures encompass up to and including 500 degrees Centigrade.

4. A process for contacting substances which are in different first and second phases, said first phase comprising a gaseous or vapor phase with or without entrained solids in solution or dispersion, comprising:
  (a) introducing said first phase in such a way that it flows helicoidally in a vertically descending helical pattern which is symmetrical with respect to a first horizontal plane passing through a vertical axis of helicoidal flow of said first phase;
  (b) passing said symmetrical helical flow through a restricted aperture of circular cross-section lying in a second horizontal plane and having its center along the vertical axis of helicoidal flow;
  (c) passing said flow of said first phase through the restricted aperture into a circular space located below the restricted aperture such that the paths of movement of said first phase following passage through the restricted aperture is in the form of a layered horizontal stack of a plurality of hyperboloids and a localized zone of low pressure having a small width is formed below the restricted aperture;
  (d) introducing a second phase comprising a fluid as a liquid stream in rectilinear vertically descending flow through the restricted aperture along the vertical axis of helicoidal flow at a speed slow enough to permit the flow of the second phase to be a continuous stream, with said second phase being introduced through an opening formed by an inner wall of a conduit having a constant inner diameter at a portion thereof adjacent the opening, the conduit being coaxial with the vertical axis and the opening being spaced from the second horizontal plane of the restricted aperture by a length which is between zero and a mean radius of the restricted aperture; and
  (e) imparting to said first phase an amount of movement at the restricted aperture of at least 100 times greater than an amount of movement of said second phase as it passes outwardly of the opening in conduit such that said second phase is broken up substantially simultaneously upon engagement with said first phase into small particles which become entrained by said first phase for movement therewith in the same direction and intensity.

5. The process for contacting substances of claim 4, wherein the conduit has an external cross-section taken in a plane perpendicular to the vertical axis which is no greater than one quarter a cross-section of the restricted aperture taken in the second horizontal plane.

6. The process for contacting substances of claim 4, wherein the opening of the conduit is located above the second horizontal plane.

7. The process for contacting substances of claim 4, wherein the opening of the conduit is located below the second horizontal plane.

8. The process for contacting substances of claim 7, wherein the restricted aperture is formed by an opening in a horizontally extending planar surface.

9. The process for contacting substances of claim 4, wherein said second phase is entrained by said first phase in an open space below the restricted aperture having a diameter greater than that of an area of the helicoidal flow upstream of the restricted aperture.

10. The process for contacting substances of claim 4, wherein said second phase is caused to flow through the conduit by means of the low pressure of the zone of low pressure.

11. The process for contacting substances of claim 4, wherein said first phase travels in a plurality of paths of movement having identical speeds and said second phase travels in a plurality of paths of movement having identical speeds when said first and said second phases are brought into contact in step (e).

12. The process for contacting substances of claim 4, wherein the diameter of the restricted aperture is 1.5 to 5 times smaller than a zone of passage of said first phase located upstream of the restricted aperture.

13. The process for contacting substances of claim 4, wherein said second phase passes outwardly of the conduit at a speed of 0.03 to 3 m/sec.

14. The process for contacting substances of claim 4, wherein the portion of the conduit adjacent the opening extends a distance equal to at least three times the internal diameter of the conduit.

15. The process for contacting substances of claim 4, wherein the diameter of the restricted aperture is 1.7 to 3.7 times smaller than a flow passage of said first phase upstream of the restricted aperture.

* * * * *